May 20, 1952  L. R. PISTOLES  2,597,030
GAUGE
Filed May 29, 1948  2 SHEETS—SHEET 1
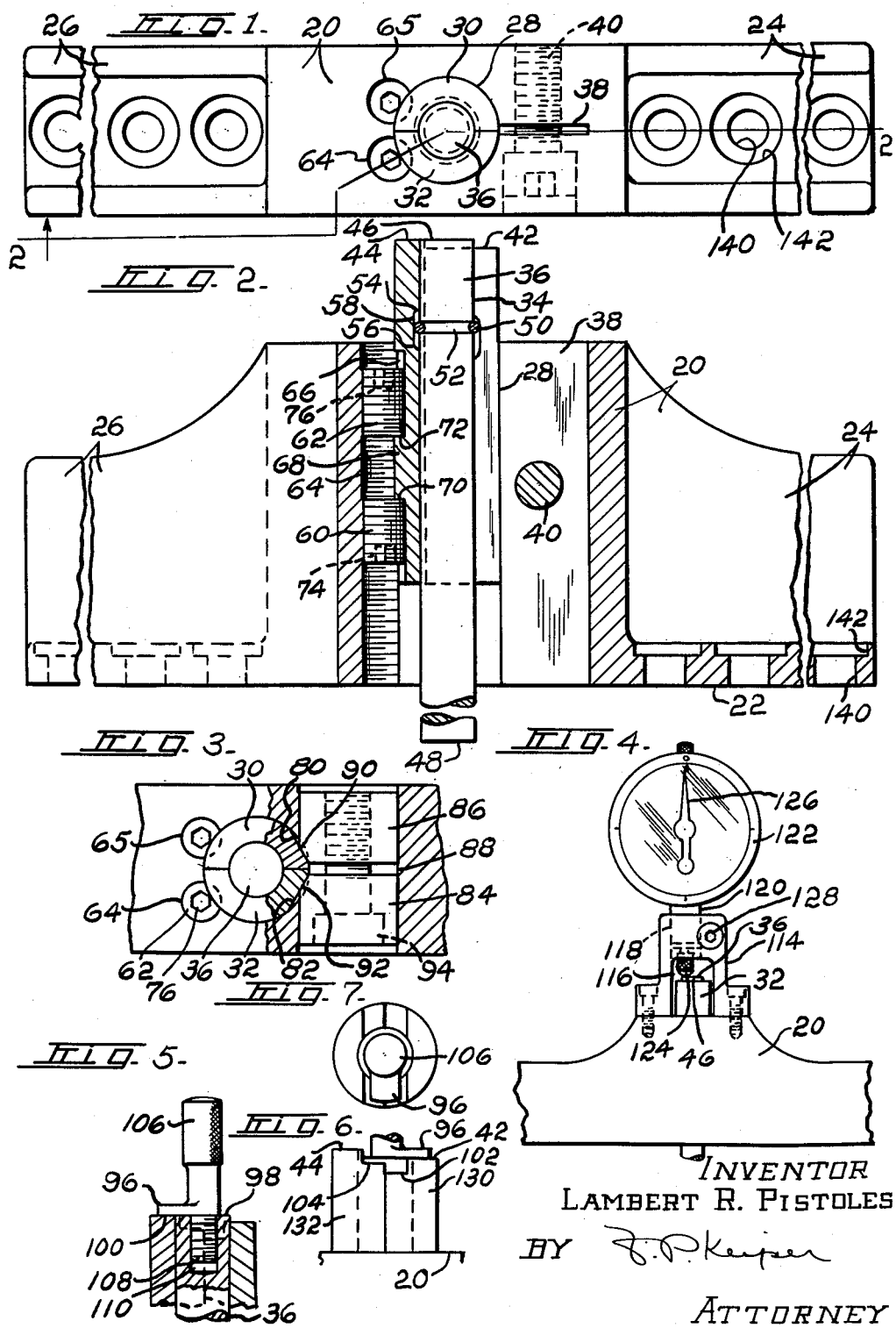
INVENTOR
LAMBERT R. PISTOLES
BY [signature]
ATTORNEY

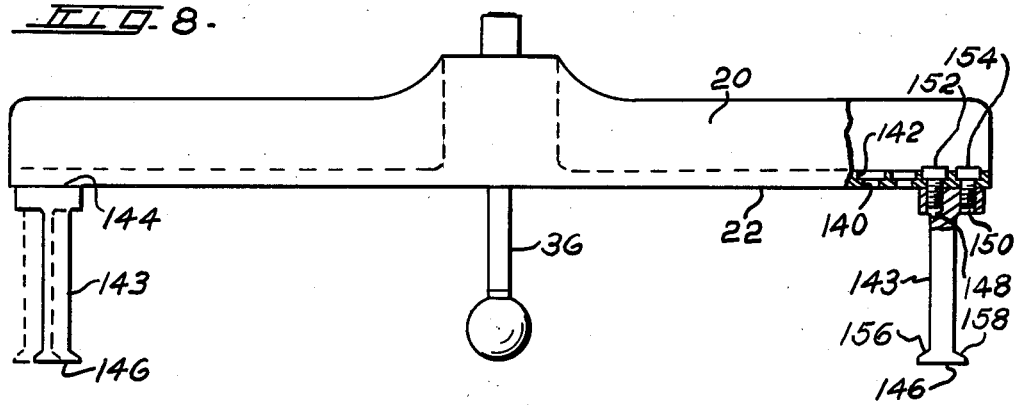
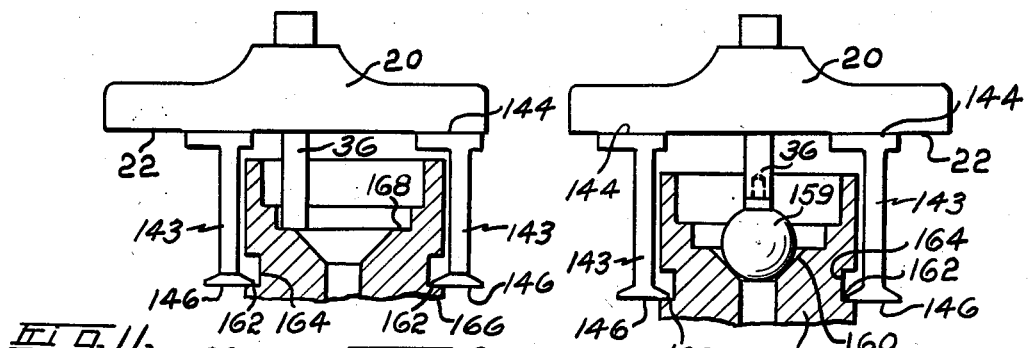
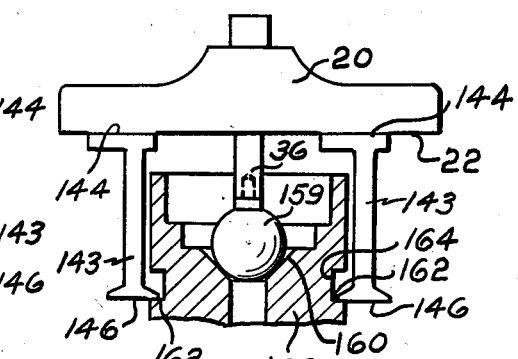
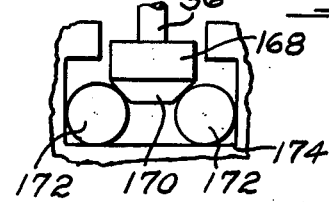
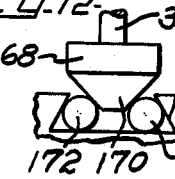
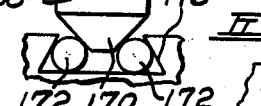
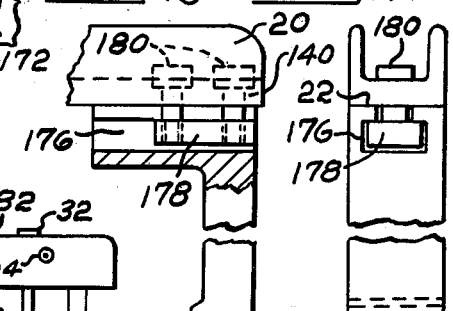
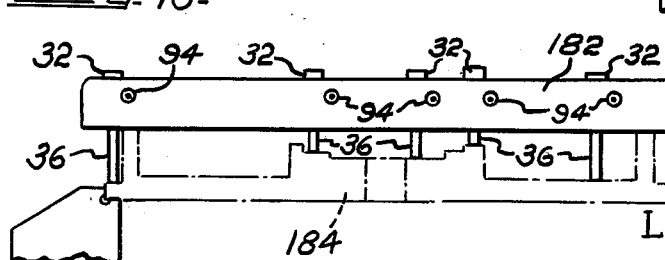
INVENTOR
LAMBERT R. PISTOLES Patented May 20, 1952

2,597,030

UNITED STATES PATENT OFFICE 2,597,030

GAUGE

Lambert R. Pistoles, Wilmington, Del.

Application May 29, 1948, Serial No. 30,069

18 Claims. (Cl. 33—169)

This invention relates to gages, and more particularly to flush pin gages adapted to be reset from time to time for adaptation to changes in work pieces requiring gaging, and changes in tolerance.

In an application filed October 19, 1946, Serial No. 704,347, there is disclosed a gage of the above classification in which the gaging dimension or tolerance may be readily set to suit requirements, and rigidly held once set, so that accurate gaging is assured. The present invention is an improvement upon the gage therein disclosed, the improvements relating to mechanism provided for setting the gage, the manner of limiting the movement of the gage pin to a range adequate for gaging operation, but otherwise limited, and various adaptations of such gages for gaging intricate shapes. Further, the invention includes adaptations of the gage to dial indicators and an improved feeler arrangement serving to simplify the actual gaging operation.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a top plan view of a pin gage embodying the invention;

Figure 2 is a side elevation with portions thereof shown in section, taken substantially on the line 2—2 of Figure 1;

Figure 3 is a fragmentary top plan view of a modified form of the invention shown partly in section;

Figure 4 is an illustration of the invention with a dial indicator and adapter applied thereto;

Figure 5 is a modified detail of the invention shown partly in section;

Figure 6 is a side elevation of the detail of Figure 5;

Figure 7 is a top plan view of the modification of Figure 5;

Figure 8 is a view of a gage having applied thereto end spacer bars and a ball contacting surface;

Figure 9 is a view of the gage of the general type of Figure 8 set up for gaging countersunk recesses in relation to exterior shoulders;

Figure 10 is a further detail view showing a gage application for measuring internal shoulder depth with relation to external surfaces;

Figures 11 and 12 show adaptations of the gage pin for gaging rectangular and dovetail channels respectively;

Figures 13 and 14 illustrate a sectional side and end elevational view of a sliding spacer securing arrangement; and Figure 15 illustrates a typical multiple gage setup.

Referring to the drawings, and more particularly to Figures 1 and 2, there is shown a frame 20 having a flat gaging surface 22 formed on extended U channel section side arms 24 and 26. The center portion is provided with a cylindrical bore 28 whose axis is perpendicular to the gage surface 22.

Positioned in the bore 28 are a pair of half sleeves 30 and 32 providing a central bore 34 in which is slidably positioned a gage pin 36. The frame member 20 may be provided with a slot as at 38 with a clamp screw 40 extending transversely thereacross for the purpose of clamping the half sleeves 30 and 32 securely in any selected position. The half sleeves 30 and 32 are provided with true planar gaging surfaces 42 and 44 perpendicular to the axis of the bore 28, which are adapted to be set in stepwise manner to provide predetermined tolerance dimensions. The end surface 46 on the end of the pin 36 is likewise a true plane, perpendicular to the bore axis, and is adapted to be compared with the surfaces 42 and 44 when the lower end 48 of the gage pin 36 is resting against a surface to be gaged with respect to its distance from the surface 22 of the gage frame.

As has been described in my copending application hereinabove referred to, the half sleeves 30 and 32 may be set to position with the gaging surfaces 42 and 44 accurately located with respect to one another and the frame, so that the pin surface will lie midway between said surfaces when the frame and end 48 of the pin are bearing against the surfaces being gaged. It will be understood that the surface 46 is ascertained by feel to lie midway between surfaces 42 and 44, when the work piece surfaces being gaged are correctly spaced. When it is ascertained that the rim surface 46 is flush with one or the other surfaces 42 or 44, when the maximum tolerance has been reached; and if the pin surface 46 is above the surface 44, or below the surface 42, then the tolerance has been exceeded and the work piece is rejected.

In order to constrain the range of movement of the pin 36 to that only somewhat greater than that required for gaging within the tolerance set, the pin is provided with a split ring 50 lying in an annular groove 52. The ring is adapted to abut against the spaced shoulders 54 and 56 of annular grooves 58 in the internal walls of each of the half sleeves 30 and 32. The axial length of the grooves 58 is such as to permit adequate movement of the pin well beyond the movement required by any tolerance dimension likely to be selected in either direction, but nevertheless restrain unnecessary further movement, Adjustment of each of the sleeves 30 and 32 axially of the bore 28 is accomplished by pairs of set screws such as 60 and 62 screw threaded in threaded bores 64 and 65 extending parallel with the bore 28 but intersecting such bore, the bores 64 and 65 being symmetrically arranged in the frame 20, and cooperating with the sleeves 32 and 30 respectively. Each of the sleeves 30 and 32 is provided with an axially extending recess 66 having a cylindrical wall of a radius equal to approximately the root diameter of the threads in the threaded bore 64, and the groove 66 is interrupted as at 68 to provide shoulders 70 and 72 for engagement with the set screws 60 and 62. The set screws 60 and 62 may have hexagonal L wrench sockets 74 and 76 in their opposite ends to facilitate adjustment of the set screws axially of the threaded bores 64 and 65. If desired, the screws may have screw driver slots. In the latter case, the apertures 64 and 65 may be filled with wax following adjustment, to seal the gage against tampering or alteration. It will be readily seen that by moving the set screws 60 and 62 axially of the bore 64, the sleeve 32 may be axially positioned gradually to whatever exact position is finally required. Likewise, the sleeve 30, by adjustment of the similar pair of set screws 60 and 62 in the threaded bore 65, may similarly be set at any desired position. It will be appreciated that during adjustment, the clamp screw 40 will be relieved permitting the sleeves 30 and 32 to move lengthwise of the bore as may be desired, and that as soon as a desired setting is attained, the sleeves will be clamped and securely held by tightening the screw 40. While the shoulders 70 and 72 may be sloped, and the bearing ends of the set screws beveled to correspond, by providing shoulders composed of surfaces lying at right angles to the axis of the pin 36, and corresponding flat bearing ends on the set screws, slight movement of the sleeves laterally of the bore in which they are positioned, upon tightening of the clamp screw 40, will not effect axial movement.

If desired, the half sleeves may be clamped in any set position by the use of wedge blocks as is shown in Figure 3, in place of the screw 40 and slot 38 of Figures 1 and 2. In this modified form of locking device, the half sleeves 30 and 32 are provided with flats 80 and 82 which are engaged by a locking bushing and nut 84 and 86 arranged in a transverse bore 88, whose axis location is similar to that of screw 40 in Figures 1 and 2. The bushing and nut are cylindrical, and each is provided with a wedge surface 90 and 92 adapted to bear against the flats 80 and 82 of the half sleeves, upon clamping action effected by the screw 94, having shouldered engagement with the bushing 84 and threaded engagement in the nut 86.

While the arrangement described in Figures 1 and 2, and regardless of the type of clamping means, is readily used by the sense of touch or feel between the end surface 46 and the sleeve ends 42 and 44, if desired, the pin 36 may be provided with a swinging hand or wing 96, as in Figures 5, 6 and 7, the wing or hand being secured solidly against the transverse end plane 98 of the pin 36, such that under surface 100 of the hand is a true extension of the plane of the pin end. By cutting away a portion of each of the sleeves 130 and 132 as at 102 and 104, a limited clearance space is provided for the hand to swing by manipulation of the knurled handle 106. In practice, the hand may be rigidly secured against the pin end by a threaded extension 108 of the handle 106, received in a threaded end aperture 110 in the pin 36. The hand may be suitably hardened.

The limited clearance provided by the notches 102 and 104 permits a free swing of the hand 96, although its under surface 100 be somewhat below the gaging surface 42 (see Figure 6). If the surface 100 be above the gaging surface 42, and below the surface 44, greater freedom of movement, or an approximately 180° swing, may be had; and if the hand surface 100 be above the surface 44, a full swing may be had. Thus an operator, with the gaging end of the pin 48 against the work, may swing the hand, and by the limits imposed upon the swing angle, determine if the dimension being gaged is within the tolerance as set, as between the surfaces 42 and 44, or outside the tolerance, as above the surface 44 or below the surface 42.

In some instances, it may be desirable to dispense with the "feel" feature of the gage and provide an adapter to the gage frame, as in Figure 4, in which a dial gage is mounted. In such an arrangement, the adapter is in the form of a cap 114 secured to the frame 20 immediately over the adjustable sleeves 30 and 32, and the pin 36. In this instance, the range of movement of the pin may be limited by the shoulders 54 and 56 of the grooves 58 in the half sleeves 30 and 32 (see Figure 2), it being understood that the shoulders of one half sleeve may be variously staggered with respect to the shoulders on the other half sleeve so as to give any range of movement of the pin 36 from as great as the axial length of the groove 58 minus the diameter of the wire forming the ring 50, to a lesser amount depending on the extent to which the half sleeves are staggered.

The adapter is hollowed out as 116, and provided with an aperture 118 for securing the frame shank 120 of a dial gage 122. The gage indicating pin 124 is caused to bear upon the end 46 of the pin 36. With the half sleeves adjusted relative to one another and the frame to provide the approximate range of movement of the pin 36 desired, usually less than a complete turn of the dial indicator 126, and preferably considerably less than a complete turn, the gage is adjusted so that the gage dial indicator is in center or zero position as shown, with the pin end 48 and frame engaging work surfaces having the correct dimension therebetween. The gage shank 120 may be locked to the adapter 114 by a transverse wedge 128 constituted by a collar and nut arrangement similar to that shown in Figure 1.

The gage frame of Figure 1 is provided in the base of the channel section arms, with a plurality of holes 140, suitably counterbored as at 142, for receiving socket head type of screws, if desired, to secure various spacer guides or rails 143 as shown in Figure 8. The rails may be of any length required for a particular gaging function, and will have parallel flat surfaces 144 and 146, the former to bear against the surface 22, and the latter to engage a work surface. Apertures 148 and 150 threaded to receive socket head screws 152 and 154, are so arranged off center that two adjustments laterally of the gage may be secured by reversing the rail, as is shown to the left of Figure 8, one position being shown in dotted lines, and the other in full lines. Various combinations of off center arrangement of the apertures 148 and 150 may be employed in a pair of spacers, so that by reversing either one or both, various lateral spacings may be obtained.

A gage so equipped with spacers having flanges such as 156 and 158 may be employed to gage a counterbore depth with relation to an external groove or shoulder as shown in Figure 9, where the gage pin is provided with a ball end 159 to bear against the conical countersunk bore 160, while the spacer flanges are adjusted to bear against the side wall 162 of the groove 164, which may be the annular groove of the member 166. As in Figure 10, the gage is set up for gaging the end face surface 168 of a counterbore with respect to the side wall 162.

Various uses of the gage will appear such as is shown in Figures 11 and 12, where the gage pin 36 may be fitted with a conical end plug 168, having a conical surface of revolution 170, adapted to bear against cylinder blocks 172, lying in a rectangular slot as 174 in Figure 11, or a dovetail slot 176 as in Figure 12.

As in Figures 13 and 14, the spacers may be secured to the frame 20 by a sliding adjustable arrangement, in which the spacers are provided with an undercut slot 176 in which is positioned a plate 178, adapted to be drawn toward the frame surface 22 by bolts 180 in the apertures 140, when the spacer is in the lateral position desired.

In Figure 15, a multiple gage setup is shown in which the gage frame 182 is provided with a plurality of half sleeves 30 and 32 with locking means, as in Figure 3 and separate pins 36. By suitable setting of the parts, a flanged wheel such as 184 may be gaged at five different points. Any number of gage setups may be arranged to suit requirements, it merely being necessary to provide a frame with suitably disposed apertures for receiving the settable half sleeves and gage pins.

While a number of variations have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a gage of the flush pin type, a frame having a gaging face, an aperture therein at right angles to said face, a pair of half sleeves in said aperture, a gaging pin adapted to float freely within said sleeves, means for securing said sleeves in set relationship with respect to said frame, and means coacting between the pin and at least one of said sleeves for limiting the range of pin travel.

2. In a gage of the flush pin type, a frame having a gaging face, an aperture therein at right angles to said face, a pair of half sleeves in said aperture, a gaging pin adapted to float freely within said sleeves, means for securing said sleeves in set relationship with respect to said frame, and means coacting between the pin and at least one of said sleeves for limiting the range of pin travel, said means including an annular elongated groove in said sleeves and a ring on said pin.

3. In a gage of the flush pin type, a frame having a gaging face, an aperture therein at right angles to said face, a pair of half sleeves in said aperture, a gaging pin adapted to float freely within said sleeves, said sleeves and pin having end faces for flush comparison, means for securing said sleeves in set relationship with respect to said frame, and means coacting between the pin and at least one of said sleeves for limiting the pin travel to a range exceeding that necessary for flush comparison.

4. In a gage of the flush pin type, a frame having a gaging face, an aperture therein at right angles to said face, a pair of half sleeves in said aperture, a gaging pin adapted to float freely within said sleeves, means for securing said sleeves in set relationship with respect to said frame, and means coacting between the pin and at least one of said sleeves for limiting the range of pin travel, said means including a semi-annular axially elongated groove in at least one of said sleeves and radially projecting abutment means carried by said pin adapted to move freely within said groove and abut the ends of said groove.

5. In a gage of the flush pin type, a frame having a gaging face, an aperture therein at right angles to said face, a pair of complementary sleeve members in said aperture, a gaging pin adapted to float freely within said sleeve members, means for securing said sleeve members in set relationship with respect to said frame, and means coacting between the pin and at least one of said members for limiting the range of pin travel, said means including opposed recesses in said pin and at least one of said members, and an element lying in both of said recesses having a radial dimension greater than the depth of either of said opposed recesses.

6. In a gage of the flush pin type, a frame having a gaging face, an aperture therein at right angles to said face, a sleeve means slidably mounted in said aperture, a gaging pin adapted to float freely within said sleeve means, means for at will securing said sleeve means in set relationship with respect to said frame, and means coacting between the pin and sleeve means for limiting the range of pin travel.

7. In a gage of the flush pin type, a frame having a gaging face, an aperture therein at right angles to said face, a sleeve means in said aperture, a gaging pin adapted to float freely within said sleeve means, means for securing said sleeve means in set relationship with respect to said frame, and means coacting between the pin and sleeve means for limiting the range of pin travel, said means comprising a ring on said pin and an axially extending recess internally of said sleeve means of limited axial length, said recess at opposite ends terminating in abutment shoulders for said ring.

8. In a gage of the flush pin type, a frame having a gaging face, an aperture therein at right angles to said face, a pair of half sleeves in said aperture having end gaging faces, a gaging pin adapted to float freely within said sleeves, and means for securing said sleeves in set relationship with respect to said frame and with their end faces axially spaced an amount equal to the combined tolerances to be gaged, said means including threaded apertures extending parallel to and intersecting said first named aperture and threaded members therein and recesses in said half sleeves complemental to said last named apertures and having abutments for engaging said members.

9. In a gage of the flush pin type, a frame having a gaging face, an aperture therein at right angles to said face, a pair of half sleeves in said aperture having end gaging faces, a gaging pin adapted to float freely within said sleeves, means for securing said sleeves in set relationship with respect to said frame and with their end faces axially spaced an amount equal to the combined tolerances to be gaged, said means including threaded apertures extending parallel to and intersecting said first named aperture and threaded members therein and recesses in said half sleeves complemental to said last named apertures and having abutments for engaging said members, and means coacting between the pin and at least one of said sleeves for limiting the range of pin travel.

10. In a gage of the flush pin type, a frame having a gaging face, an aperture therein at right angles to said face, a pair of half sleeves in said aperture having end gaging faces, a gaging pin adapted to float freely within said sleeves, means for securing said sleeves in set relationship with respect to said frame and with their end faces axially spaced an amount equal to the combined tolerances to be gaged, said means coacting between the pin and at least one of said sleeves for limiting the range of pin travel, with one end of the pin adapted to move from beyond the one end face to beyond the other end face.

11. In a gage of the flush pin type, a frame having a gaging face, an aperture therein at right angles to said face, a sleeve composed of complementary members divided longitudinally and axially shiftable with respect to one another in said aperture and having end faces, a gaging pin adapted to float freely within said sleeves, and means for securing said members in set relationship with respect to said frame and with their end faces axially spaced an amount equal to the combined tolerances to be gaged, and an indicating surface carried by the end of said pin and extending radially beyond the pin and adapted to cooperate with said end faces to indicate the position of said pin with reference to said end faces.

12. In a gage of the flush pin type, a frame having a gaging face, an aperture therein at right angles to said face, a sleeve composed of complementary members divided longitudinally and axially shiftable with respect to one another in said aperture and having end faces, a gaging pin adapted to float freely within said members, means for securing said sleeves in set relationship with respect to said frame and with their end faces axially spaced an amount equal to the combined tolerances to be gaged, and an indicating surface carried by the end of said pin and adapted to cooperate with said end faces to indicate the position of said pin with reference to said end faces, and means coacting between the pin and at least one of said sleeves for limiting the range of pin travel.

13. In a gage of the flush pin type, a frame having a gaging face, an aperture therein at right angles to said face, a pair of half sleeves in said aperture having end faces, a gaging pin adapted to float freely within said sleeves and having a hand at one end with a transverse planar surface projecting radially therefrom and adapted to cooperate with said end faces, means for securing said sleeves in set relationship with respect to said frame and with their end faces axially spaced an amount equal to the combined tolerances to be gaged.

14. In a gage of the flush pin type, a frame having a gaging face, an aperture therein at right angles to said face, a pair of half sleeves in said aperture having end faces, a gaging pin adapted to float freely within said sleeves and having a hand at one end with a transverse planar surface projecting radially therefrom and adapted to cooperate with said end faces, means for securing said sleeves in set relationship with respect to said frame and with their end faces axially spaced an amount equal to the combined tolerances to be engaged, and means coacting between the pin and at least one of said sleeves for limiting the range of pin travel.

15. In a gage of the flush pin type, a frame having a gaging face, an aperture therein at right angles to said face, a pair of half sleeves in said aperture having end faces, a gaging pin adapted to float freely within said sleeves and having a hand at one end with a transverse planar surface projecting radially therefrom and adapted to cooperate with said end faces, means for securing said sleeves in set relationship with respect to said frame and with their end faces axially spaced an amount equal to the combined tolerances to be gaged, and means coacting between the pin and at least one of said sleeves for limiting the range of pin travel, said means including an internal annular groove in said half sleeves, and a ring abutment on said pin.

16. In a gage of the flush pin type, a frame having a gaging face, an aperture therein at right angles to said face, a pair of half sleeves in said aperture having end faces, a gaging pin adapted to float freely within said sleeves and having a hand at one end with a transverse planar surface projecting radially therefrom and adapted to cooperate with said end faces, means for securing said sleeves in set relationship with respect to said frame and with their end faces axially spaced an amount equal to the combined tolerances to be gaged, at least one of said sleeves being notched adjacent said end faces to provide limited clearance for said hand.

17. In a gage of the flush pin type, a frame having a gaging face, an aperture therein at right angles to said face, a pair of half sleeves in said aperture, a gaging pin adapted to float freely within said sleeves, means for securing said sleeves in set relationship with respect to said frame, and extension members having spaced parallel faces secured in spaced relation to said gaging face with one parallel face of each in contact with said gaging face.

18. In a gage of the flush pin type, a frame having a gaging face, an aperture therein at right angles to said face, a pair of half sleeves in said aperture, a gaging pin adapted to float freely within said sleeves, means for securing said sleeves in set relationship with respect to said frame, extension members having spaced parallel faces secured in spaced relation to said gaging face with one parallel face of each in contact with said gaging face, and slidable means for securing said members at any point along the length of said face.

LAMBERT R. PISTOLES.

REFERENCES CITED

The following references are of record in the file of this patent:

UNITED STATES PATENTS

| Number | Name | Date |
| --- | --- | --- |
| 2,363,165 | Vierling | Nov. 21, 1944 |
| 2,466,185 | Stoothoff | Apr. 5, 1949 |

FOREIGN PATENTS

| Number | Country | Date |
| --- | --- | --- |
| 74,645 | Switzerland | Mar. 16, 1917 |

OTHER REFERENCES

Publication: Machinery, page 911, July 1926.